(12) United States Patent
Ariyama et al.

(10) Patent No.: US 6,201,866 B1
(45) Date of Patent: Mar. 13, 2001

(54) ECHO CANCELER EMPLOYING SEGMENT-BASED REINITIALIZATION

(75) Inventors: Yoshihiro Ariyama; Masashi Takada, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/056,775

(22) Filed: Apr. 8, 1998

(30) Foreign Application Priority Data

May 12, 1997 (JP) .............................................. 9-120572-97

(51) Int. Cl.[7] .................................................... H04M 1/00
(52) U.S. Cl. ............................................ 379/410; 379/406
(58) Field of Search .................................... 379/377, 402, 379/406, 410, 411, 416–417, 390, 392; 370/289–291; 375/344–346, 350–351; 381/66, 94.1–94.3

(56) References Cited

U.S. PATENT DOCUMENTS

| 4,628,156 | * | 12/1986 | Irvin | 379/410 |
| 5,272,695 | * | 12/1993 | Makino et al. | 379/410 |
| 5,329,587 | * | 7/1994 | Morgan et al. | 379/406 |
| 5,463,618 | * | 10/1995 | Furukawa et al. | 379/410 |
| 5,477,534 | * | 12/1995 | Kusano | 379/410 |
| 5,960,077 | * | 9/1999 | Ishii et al. | 379/410 |

OTHER PUBLICATIONS

Yutaka Kaneda, "Adaptive Filtering", Journal of the Acoustical Society of Japan, vol. 48, No. 7, 1992, pp. 489–492.

* cited by examiner

Primary Examiner—Duc Nguyen
Assistant Examiner—George Eng
(74) Attorney, Agent, or Firm—Venable; Robert J. Frank; Michael A. Sartori

(57) ABSTRACT

An echo canceler has an adaptive filter with coefficients grouped into segments, and a candidate value memory that stores candidate values for each segment. Signal levels in the echo canceler are monitored to determine when reinitialization is necessary. When reinitialization is necessary, the candidate values are assigned to the coefficients in the corresponding segments, and corresponding residual signals are generated. The residual signals are evaluated to select a best candidate value for each segment. The selected best candidate value is assigned to all coefficients in the corresponding segment.

20 Claims, 6 Drawing Sheets

ECHO CANCELER EMPLOYING SEGMENT-BASED REINITIALIZATION

BACKGROUND OF THE INVENTION

The present invention relates to an echo canceler for canceling echo components in a local input signal.

Echo cancelers are used in communication devices such as hands-free automobile telephone sets and video-conferencing terminals. An echo canceler has a filter that processes a signal received from a far-end communication device, estimates the echo that the received signal will produce in the local input signal, and creates a replica of the estimated echo. The echo replica is subtracted from the local input signal so that the party at the far end will not hear an echo of his or her own voice.

The filter has tap coefficients that represent the transfer characteristics of the echo path. To deal with changes in the characteristics of the echo path, and with external noise, the tap coefficients are adjusted by an algorithm that attempts to reduce the residual echo left after echo cancellation. Two widely-used algorithms are the least mean squares (LMS) algorithm and the normalized least mean squares (NLMS) algorithm, both of which have the advantages of stable operation and comparatively light computational requirements.

These algorithms have the disadvantage, however, of converging only slowly to a state that accurately reflects the transfer characteristics of the echo path. In an automobile telephone, for example, changes in echo path characteristics can occur rapidly, as when the driver changes position, or places a hand near the microphone or loudspeaker of the telephone set. The LMS and NLMS algorithms cannot be relied on to respond to rapid changes with satisfactory speed.

Algorithms that converge faster, such as the affine projection algorithm, have been proposed, but these algorithms require extensive computation, and have rarely been put into practice.

SUMMARY OF THE INVENTION

An object of the present invention is to provide an echo canceler that can adapt to rapid changes in echo path characteristics without demanding extensive computation.

The invented echo canceler has an adaptive filter with coefficients that are adjusted to match the characteristics of an echo path. The coefficients are applied to samples of a received signal to generate an echo replica, which is subtracted from a local input signal to create a residual signal for outgoing transmission. The coefficients are grouped into segments, and a plurality of candidate values are stored for each segment, in a candidate value memory.

Signal levels in the echo canceler are monitored to determine when reinitialization is necessary. When reinitialization is necessary, all of the candidate values are tested by being assigned to the coefficients in the corresponding segments. Corresponding echo replicas and residual signals are generated, and the residual signals are evaluated to select a best candidate value for each segment. The selected best candidate value is assigned to all of the coefficients in the corresponding segment.

DETAILED DESCRIPTION OF THE INVENTION

Embodiments of the invention will be described with reference to the attached exemplary drawings. In these drawings, Rin and Rout denote signals received from a far communication device. Sin, Sin', and Sout denote signals sent toward the far end. Rin, Sin', and Sout are digital electrical signals; Rout and Sin are acoustic signals. For simplicity, the transducers (for example, a microphone and a loudspeaker) and the digital-to-analog and analog-to-digital conversion circuitry used in creating Rout, Sin', and Sout have been omitted from the drawings.

Figure 1:
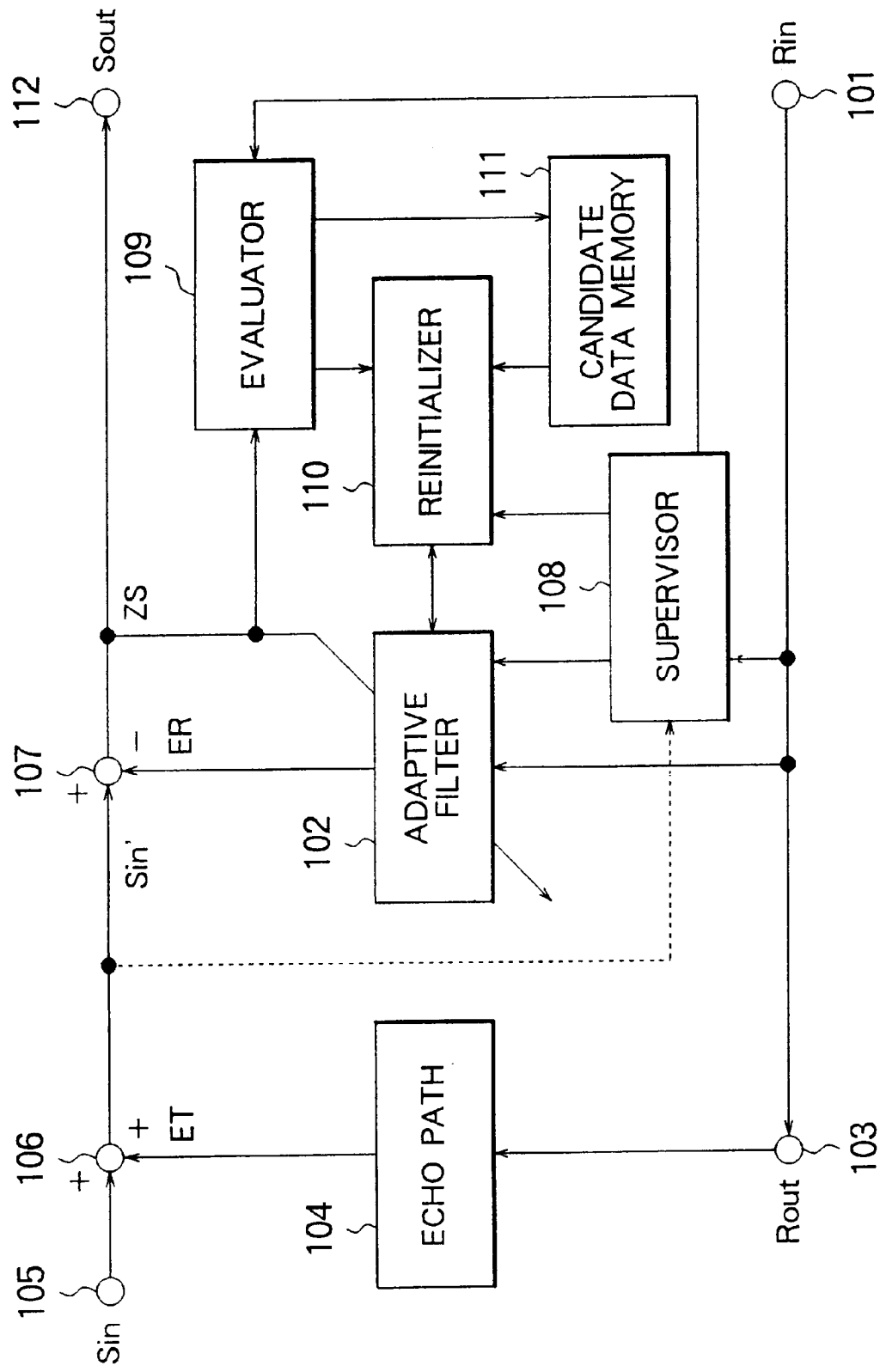
FIG. 1 is a block diagram of a first embodiment of the invention.

Referring to FIG. 1, in a first embodiment of the invention, Rin is received from the far end at a local input terminal 101, supplied to an adaptive filter 102, and supplied in analog form to a local output terminal 103 linked to, for example, a loudspeaker, which creates the acoustic received signal Rout. Rout travels on an echo path 104 and becomes an acoustic echo signal ET, which is added to an acoustic signal Sin generated by a local signal source 105. In an automobile telephone, the local signal source 105 includes, for example, the passengers in the automobile. The echo signal ET and input signal Sin are combined at a local input terminal 106, such as the electrical terminal of a microphone. After analog-to-digital conversion, the sum of Sin and ET becomes a combined digital input signal Sin'.

The echo canceler comprises the adaptive filter 102 and an adder 107, a supervisor 108, an evaluator 109, a reinitializer 110, and a candidate data memory 111. The overall function of the echo canceler is to remove the echo component ET from the combined local input signal Sin' before Sin' is returned to the far end. The functions of the individual elements in the echo canceler are as follows.

The adaptive filter 102 analyzes the transfer characteristics, more specifically the impulse response, of the echo path 104, and creates an echo replica signal ER. The adder 107 subtracts the echo replica signal ER from the combined local input signal Sin', by adding the two's complement of ER to Sin', to produce an echo residual signal ZS, which is supplied to an output terminal 112 for outgoing transmission as the output signal Sout. The residual signal ZS is also supplied to the adaptive filter 102 and evaluator 109.

The internal components of the adaptive filter 102, not shown in the drawing, include a coefficient register for storing tap coefficients, a sample register for storing consecutive sample values of the received signal Rin, a multiplier for multiplying these sample values by the tap coefficients, and an adder for taking the sum of the resulting products, thereby generating the echo replica signal ER.

The adaptive filter 102 also has circuitry or other means for adjusting the tap coefficients in the coefficient register by, for example, the NLMS algorithm, to adapt to small or gradual changes in the transfer characteristics of the echo path 104. When the tap coefficients are adjusted in this way, the echo canceler is said to operate in its normal mode.

The echo canceler can also operate in a reinitializing mode, in which the tap coefficients are reinitialized by the reinitializer 110. The supervisor 108 monitors the combined local input signal Sin' and far-end input signal Rin to decide when reinitialization is necessary. Reinitialization becomes necessary when a large, abrupt change occurs in the transfer characteristics of the echo path 104, exceeding the adaptive capability of the adaptive filter 102, so that the transfer characteristics of the echo path 104 differ significantly from the characteristics expressed by the tap coefficients currently being used.

The supervisor 108 can recognize the need for reinitialization according to various criteria. One possible scheme is to reinitialize when the average power level of the combined local input signal Sin' is equal to or less than a first threshold, and the average power level of the far-end input signal Rin is equal to or greater than a second threshold.

The invention is not limited to this method of deciding when to reinitialize; the decision can be made by applying other criteria to Sin' and Rin, or to other signals. For example, the supervisor 108 can decide when to reinitialize by monitoring the residual signal ZS and far-end input signal Rin. The Sin' input signal line to the supervisor 108 is accordingly indicated by a dotted line in FIG. 1.

Upon detecting the need for reinitialization, the supervisor 108 gives commands that cause a series of reinitializing operations to be performed. When these operations have been completed, the supervisor 108 commands the echo canceler to return to the normal mode.

Whereas the adaptive filter 102 and adder 107 operate during both the normal mode and reinitializing mode, the evaluator 109, reinitializer 110, and candidate data memory 111 operate only in the reinitializing mode.

The tap coefficients in the adaptive filter 102 are divided into equal segments. The first segment includes the tap coefficients that are applied to the most recent samples of the received signal Rin; the other segments include tap coefficients applied to progressively older samples. All segments have the same number of tap coefficients; that is, all segments have the same length. The number of segments will be denoted below by the upper-case letter N.

The candidate data memory 111 stores, for each segment, a plurality of candidate values. Each value is a candidate value for all tap coefficients in the segment. All segments have the same number of candidate values. The number of candidate values per segment will be denoted below by the lower-case letter n.

Giving all segments the same length and the same number of candidate values simplifies the control of the reinitialization process.

When the supervisor 108 gives the command for reinitialization, the reinitializer 110 reads all of the candidate values for each segment from the candidate data memory 111 in turn, starting with the first segment. Each time the reinitializer 110 reads a candidate value for a given segment, the reinitializer 110 replaces all tap coefficients in that segment in the adaptive filter 102 with the candidate value, and the adaptive filter 102 uses the new values of these tap coefficients to calculate a new echo replica, which is subtracted from the local input signal Sin' to obtain a residual signal ZS. The evaluator 109 evaluates each candidate value from its effect on the residual signal ZS, and selects the best candidate tap coefficient for each segment.

Figure 2:
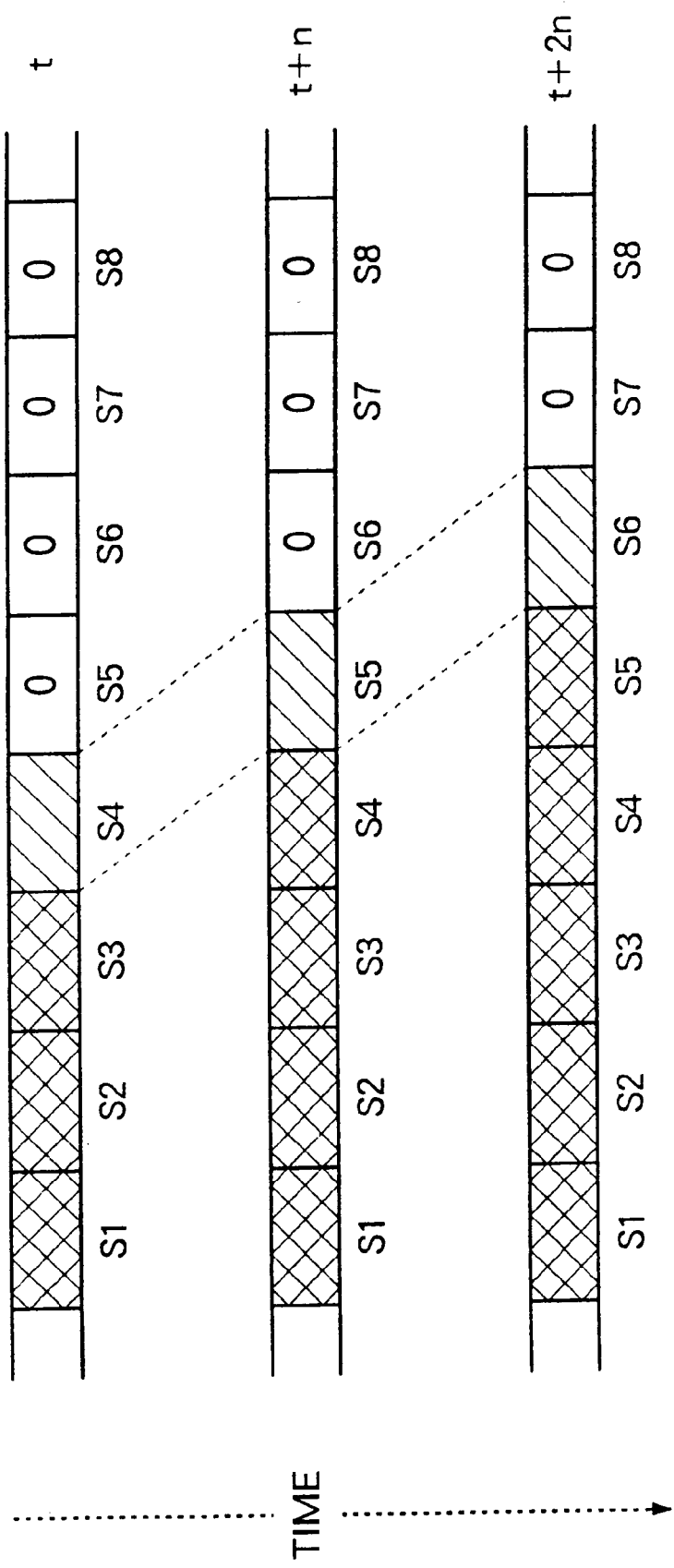
FIG. 2 illustrates the reinitialization of successive segments of tap coefficients in the first embodiment.

FIG. 2 illustrates three stages in the reinitialization process. At time t, the best candidates for the first three segments S1, S2, and S3 have already been found and assigned to the tap coefficients in those segments. The reinitializer 110 now assigns the n candidate values for segment S4 in turn to all of the tap coefficients in segment S4, setting the tap coefficients in segment S5 and higher-numbered segments to zero. The evaluator 109 evaluates the results and selects the best candidate for segment S4.

At time t+n, the reinitializer 110 sets the tap coefficients in segment S4 to their best candidate value as found above, then sets the tap coefficients in segment S5 to their n candidate values in turn. The tap coefficients in segments S1, S2, and S3 retain the best candidate values that were found previously, and the tap coefficients in segment S6 and higher-numbered segments remain set at zero. The evaluator 109 evaluates the results and selects the best candidate for segment S5.

At time t+2n, the reinitializer 110 and evaluator 109 find the best candidate for segment S6 in a similar manner.

The reason for starting from the first segment, containing the tap coefficients for the most recent samples, is that the echo power of an impulse tends to rise quickly, then fade more slowly. Starting with the first segment enables most of the echo power to be canceled quickly, after which the best tap coefficient values for later segments can be determined more accurately.

Next, the overall operation of the first embodiment will be described.

In the normal mode, the first embodiment operates much as a conventional echo canceler. The tap coefficients h(t) used in the adaptive filter 102 at time t are estimates of the impulse response of the echo path 104 at time t. In the description below, h(t) will be treated as a column vector, and H(t) as a row vector equal to the transpose of h(t). A series of consecutive samples of the far-end input signal Rin up to time t forms a column vector x(t) having the same size as h(t). The echo replica signal ER is a scalar quantity, calculated as follows.

$$ER = H(t) \times (t)$$

If y(t) is the scalar value of the combined local input signal Sin' at time t, and e(t) is the scalar value of the residual signal ZS, then since ZS is obtained by subtracting ER from Sin', $$e(t) = y(t) - H(t) \times (t).$$

If the NLMS algorithm is employed, the adaptive filter tap coefficients are adjusted according to the following equation, in which X(t) is a row vector equal to the transpose of x(t), $\alpha$ is a step-gain constant in the range $0 < \alpha < 2$, and $\beta$ is a small positive constant added to prevent division by zero.

$$h(t+1) = h(t) + \alpha e(t) \times (t)/(X(t) \times (t) + \beta)$$

The difference between the operation of the first embodiment in the normal mode and the operation of a conventional echo canceler is that the supervisor 108 monitors the input signals to detect conditions requiring reinitialization. When these conditions are detected, the first embodiment operates as shown in the flowchart in FIG. 3.

In step 1000, the supervisor 108 commands the adaptive filter 102, evaluator 109, and reinitializer 110 to begin operating in the reinitializing mode. The adaptive filter 102 stops adjusting its tap coefficients and clears all of the tap coefficient values to zero. The supervisor 108 also sets a candidate-number parameter i and a segment-number parameter j to initial values of one.

The next four steps form a loop that tests the candidate tap coefficients for one segment. The symbol $h_0(i, j)$ will be used to denote the i-th candidate tap coefficient for the j-th segment.

This value $h_0(i, j)$ is read from the candidate data memory 111 in step 1001, and set in the adaptive filter 102 as the value of all tap coefficients in the j-th segment. As described above, the tap coefficients in any segments before the j-th segment have best candidate values that have been determined previously, and the tap coefficients in any segments after the j-th segment have values of zero. The assignment of the i-th candidate value to the j-th segment can be expressed in symbols as follows.

$$h'(t)=h'(i, j)=h(j-1)+h_0(i, j)$$

In this equation, $h'(t)$ and $h'(i, j)$ both denote the column vector of tap coefficients at the current time t during the reinitialization process, when the i-th candidate tap coefficient for the j-th segment is being tested; $h(j-1)$ denotes the column vector of tap coefficients after the best candidate tap coefficient for the (j-1)-th segment was determined; and $h_0(i, j)$ is regarded as a column vector having the i-th candidate value for each tap coefficient in the j-th segment and zero for all tap coefficients in other segments.

In the next step 1002, the adaptive filter 102 computes an echo replica signal ER as the product of $H'(t)$ and $x'(t)$, where $H'(t)$ is the row vector obtained by transposing $h'(t)$, and $x'(t)$ is a column vector equal to the column vector $x(t)$ of samples of Rin up to time t, or to a column vector having these sample values in the first j segments and values of zero in any remaining segments. Values of zero are also inserted in $x'(t)$ to take the place of any missing sample values.

In the next step 1003, the adder 107 subtracts the echo replica signal ER from the combined local input signal $y(t)$ to obtain a residual signal $ee(t)$ or $ee(i, j)$, as follows.

$$ee(t)=ee(i, j)=y(t)-H'(t)x'(t)$$

The same value of $y(t)$ and the same column vector $x'(t)$ are used to test all candidate tap coefficients for all segments, even if new samples of the far-end input signal Rin are received in the meantime. The residuals $ee(t)$ are stored in the evaluator 109.

The next step 1004 increments the parameter i, then returns to step 1001 if the resulting value of i is equal to or less than number n of candidate tap coefficients per segment. The loop from step 1001 to step 1004 is repeated until residuals have been stored for all candidate tap coefficients in the j-th segment.

In the next step 1005, the evaluator 109 compares the magnitudes of the residuals stored for the j-th segment, and selects a candidate value that gave the smallest residual value. The reinitializer 110 assigns this selected value to the tap coefficients in the j-th segment in the adaptive filter 102, and uses this value in testing the following segments, as shown in FIG. 2.

In the next step 1006, the supervisor 108 compares the parameter j with the total number of segments N. If j is less then N then in the next step 1007, j is incremented and i is reset to one, and the process returns to step 1000 to test the next segment. If j is equal to N, the supervisor 108 terminates the reinitializing process and returns the echo canceler to the normal mode of operation in step 1008.

At the end of the reinitialization process, the best candidate values have been assigned to all segments of tap coefficients. Operation in the normal mode begins from these best candidate values.

The computation of the residual signals $ee(t)$ involves repeated multiply-add computations $H'(t)x'(t)$, but because the same candidate value is used for all tap coefficients in a segment, only one multiplication per candidate per segment is necessary. In addition, once a best candidate has been selected, its value does not change for the duration of the reinitializing process, so if the result of each multiplication operation is stored, only one multiplication operation per candidate per segment is necessary during the entire reinitializing process. If, for example, the number of candidate values per segment is equal to the number of tap coefficients per segment, the total number of multiplication operations involved in the reinitializing process is no greater than the number of multiplication operations required for the computation of one echo replica signal ER during normal operation. Depending on the speed with which the other operations (addition, subtraction, and comparison) are performed, the entire reinitialization process may be completed within the normal time for processing one sample of the far-end input signal Rin.

The reinitialized tap coefficients will rarely match the transfer characteristics of the echo path 104 perfectly, but when the transfer characteristics change abruptly, the reinitializing process can produce tap coefficients that approximately match the new transfer characteristics much faster than would be possible with conventional methods such as the LMS or NLMS algorithm. After this approximate match has been established, the conventional algorithm takes over in the normal mode and converges in the usual manner. Reinitialization shortens the total convergence time.

Dividing the tap coefficients into segments enables a large number of combinations of tap coefficients to be tested even if there are only relatively few candidate tap coefficients for each segment. For a given total amount of candidate tap coefficient data, it is better to provide a relatively small number of candidate values for each of a plurality of segments, than to provide a larger number of candidate values, each of which is applied to all of the tap coefficients uniformly.

Next, a second embodiment will be described.

Figure 4:
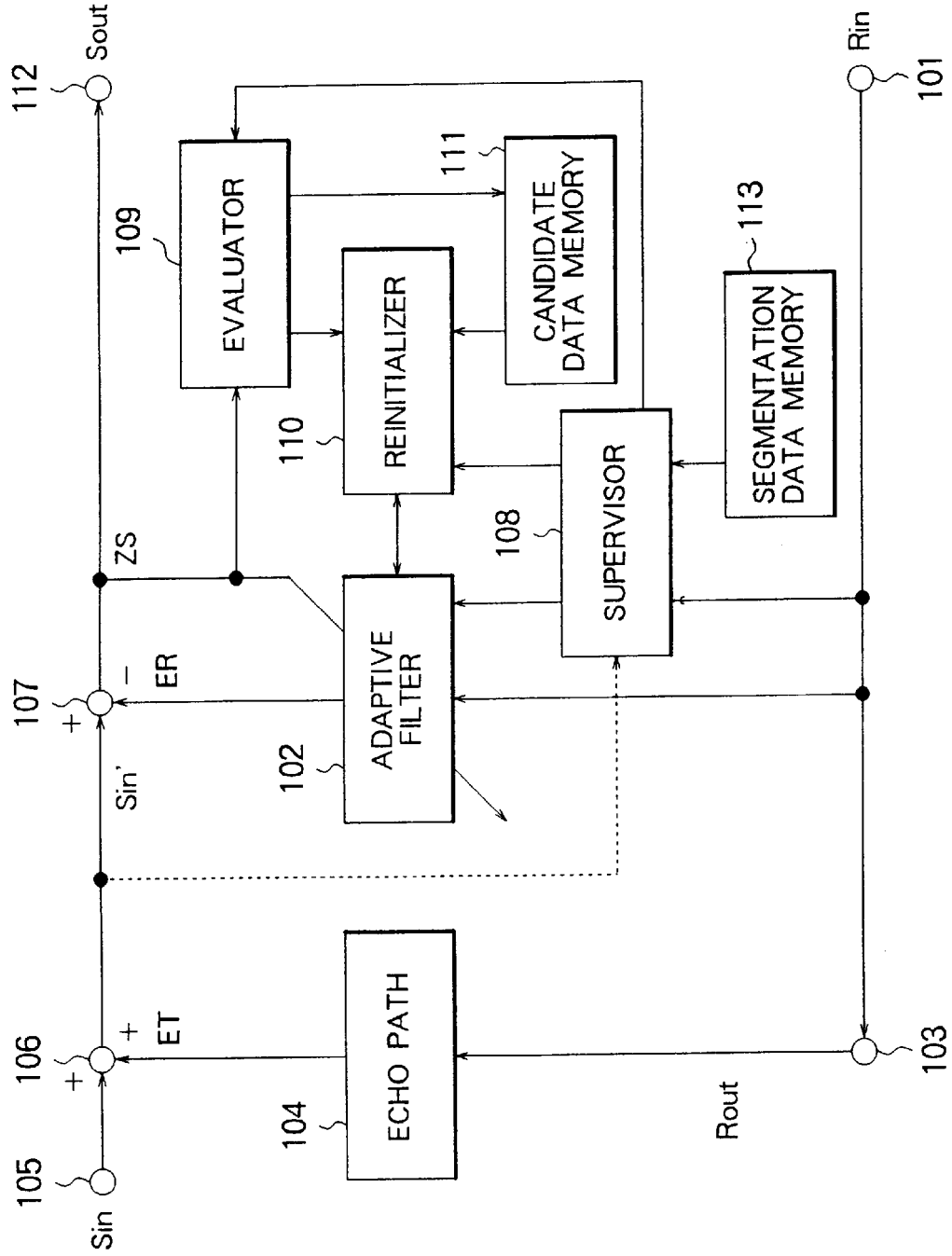
FIG. 4 is a block diagram of a second embodiment of the invention.

FIG. 4 shows the second embodiment, using the same reference numerals as in FIG. 1 for identical or equivalent elements. The new element in the second embodiment is a segmentation data memory 113, which stores information describing the segmentation of the tap coefficients, and supplies this information to the supervisor 108. The information stored in the segmentation data memory 113 specifies the length and number of candidate values for each segment individually.

In the first embodiment, all segments were of equal length, and each segment had the same number (n) of candidate values. In the second embodiment, different segments have different lengths and different numbers of candidate values. From the first segment to the last segment, the segment length increases, and the number of candidate values decreases.

The reason for this arrangement is that, as noted above, the power of the impulse response of the echo path is greatest in the interval corresponding to the first few segments of tap coefficients, and becomes smaller in succeeding intervals. The tap coefficients follow a similar pattern. The later, higher-numbered segments of tap coefficients therefore tend to take on a smaller range of values than the earlier, lower-numbered segments, and can be adequately covered by fewer candidate values than are needed in the earlier segments. Because the tap coefficients tend to vary less in later segments than in earlier segments, the later segments can also be longer than the earlier segments.

The amount of computation required in testing the candidate values for one segment depends on both the number of tap coefficients in the segment, and the number of candidate values for the segment. If these two quantities are inversely related, the amount of computation per segment can be kept substantially constant.

Figure 5:
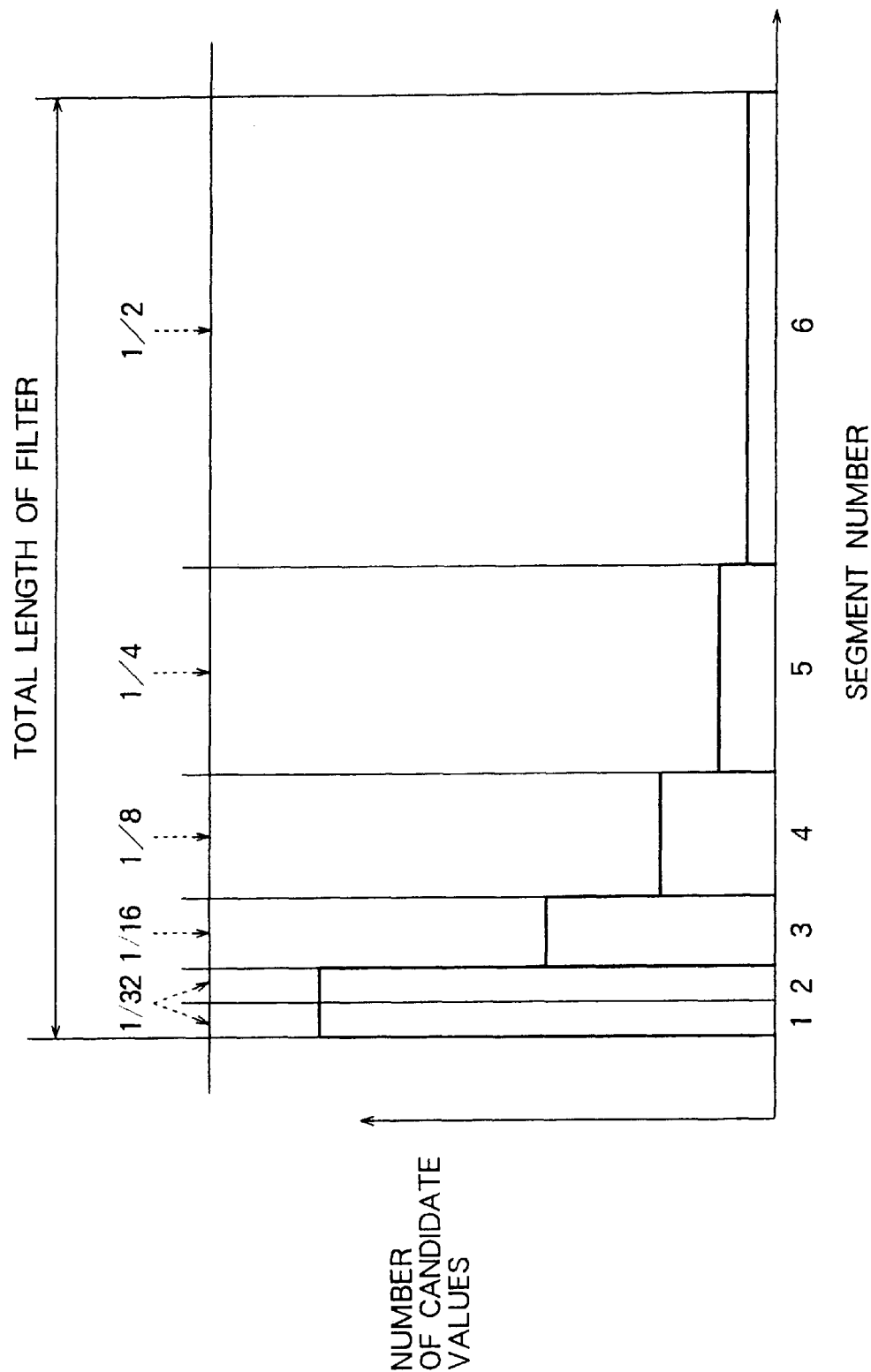
FIG. 5 shows an example of the segment structure in the second embodiment.

FIG. 5 shows one example of a type of segmentation that can be employed in the second embodiment. The horizontal axis represents the total length of the filter; that is, the total number of tap coefficients. The vertical axis represents the number of candidate values stored in the candidate data memory 111 for each segment. The first two segments each have one thirty-second of the total number of tap coefficients, and each has the same number of candidate values. Each succeeding segment is twice as long as the preceding segment, but has only half as many candidate values. For example, the third segment is twice as long as the second segment (one sixteenth of the total length), but has only half as many candidate values. The number of candidate values for a segment is inversely proportional to the segment length.

As FIG. 5 shows, it is not necessary for every segment to be longer than the preceding segment and have fewer candidate values; some pairs of adjacent segments may be of equal length, and some pairs of adjacent segments may have equal numbers of candidate values. Furthermore, although an inverse relationship between segment length and number of candidate values is convenient for controlling the amount of computation, this relationship is not required. The segment length should be a generally non-decreasing function of the segment number, and the number of candidate values should be a generally non-increasing function of the segment number, but within this limitation, many variations are possible.

Figure 3:
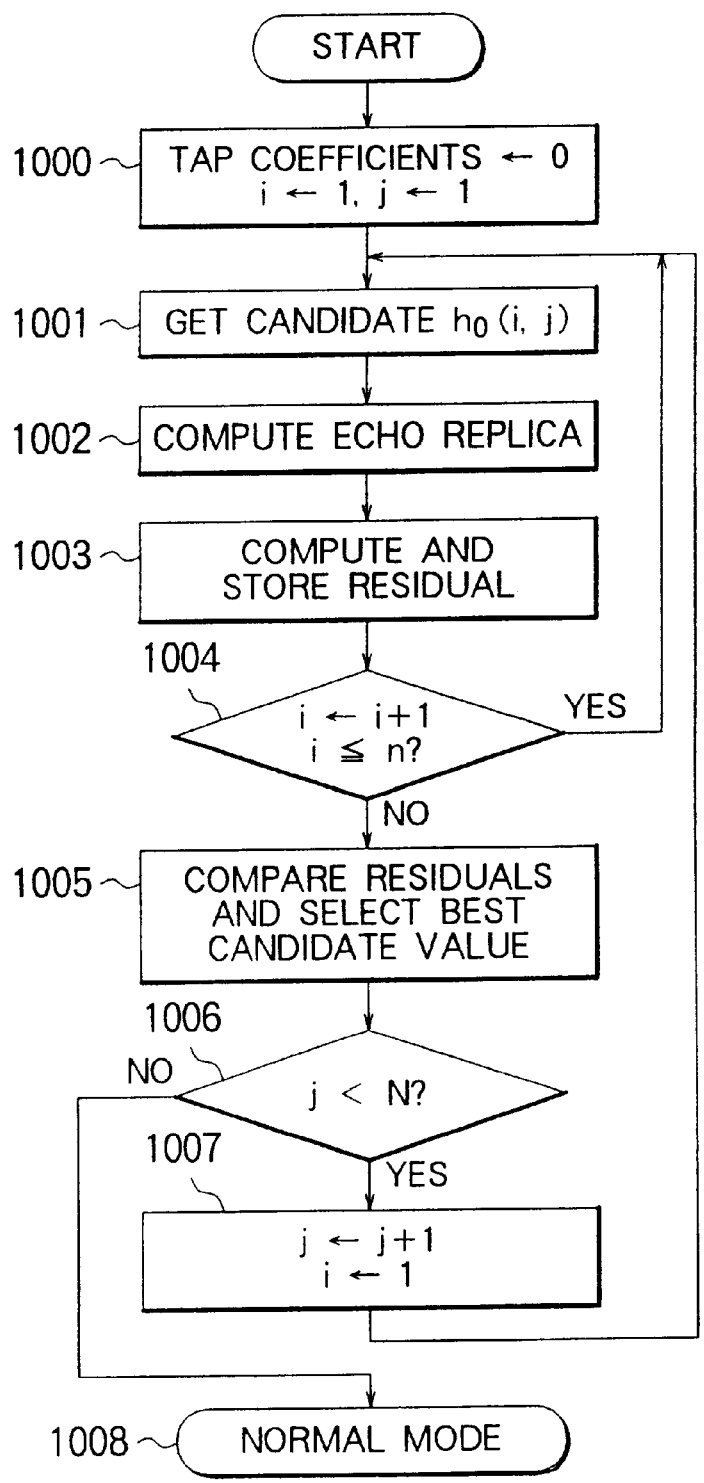
FIG. 3 is a flowchart illustrating the operation of the first embodiment.
Figure 6:
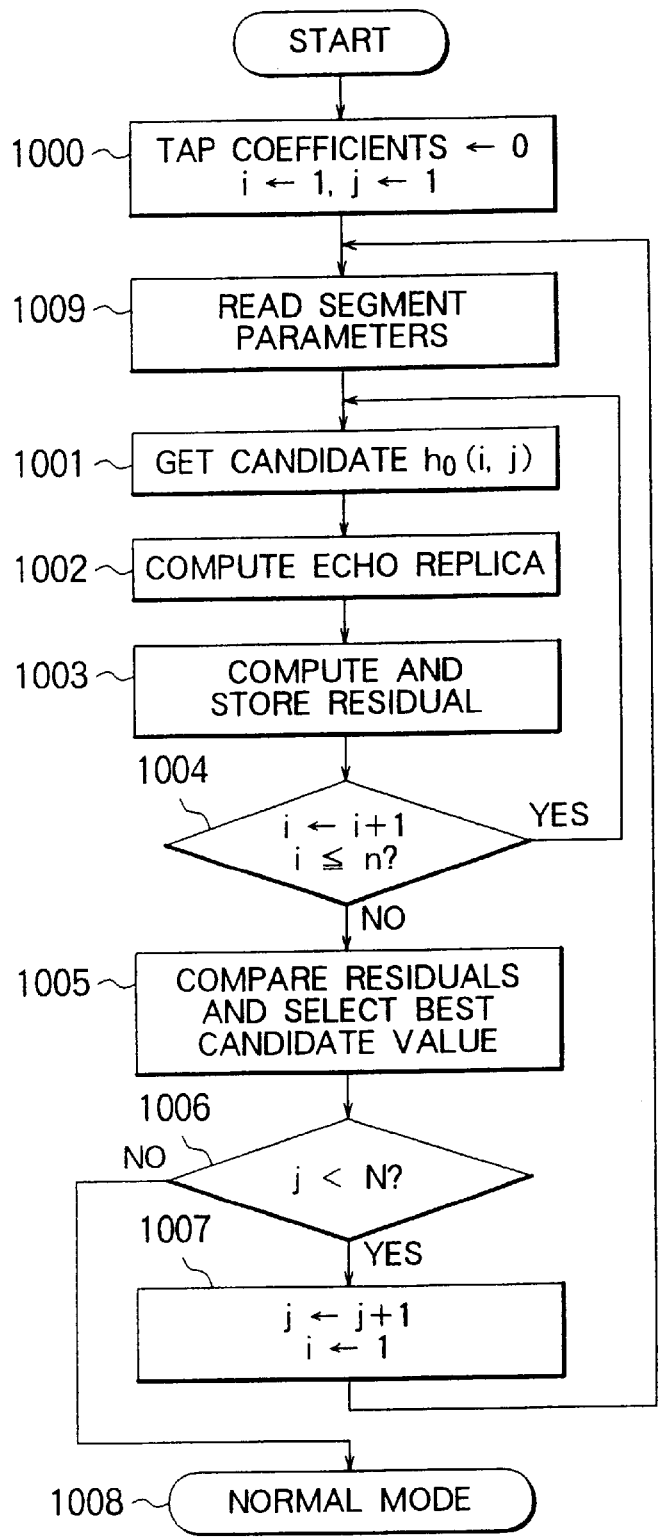
FIG. 6 is a flowchart illustrating the operation of the second embodiment.

FIG. 6 illustrates the operation of the second embodiment, using the same reference numerals as in FIG. 3 for identical or equivalent steps.

In the first step 1000, all tap coefficients are cleared to zero, and the segment number (j) and candidate number (i) are initialized to one.

In the next step 1009, the supervisor 108 reads the parameters of the current segment from the segmentation data memory 113. These parameters give the segment length and the number of candidate tap coefficient values (n) in the segment.

The succeeding steps, from step 1002 to step 1008, are the same as the corresponding steps in the first embodiment, so detailed descriptions will be omitted. In carrying out these steps, the reinitializer 110 uses the parameters read from the segmentation data memory 113 to determine which tap coefficients to modify in the adaptive filter 102, and to decide when all candidate values for the current segment have been tested. In step 1004, the number of candidate tap coefficient values (n) varies from segment to segment.

The second embodiment provides effects similar to the first embodiment, but by placing fewer tap coefficients and more candidate values in the low-numbered segments, in which most of the echo power occurs, the second embodiment can obtain a more accurate approximation to the transfer characteristic of the echo path. Subsequent convergence of the algorithm used in the normal mode will therefore be faster than in the first embodiment. This improvement can moreover be achieved without increasing the total amount of computation required in the reinitializing process.

The above are only two of many possible embodiments of the present invention. Other embodiments can be obtained by using different algorithms for adjusting the tap coefficients in the normal mode, such as various known variations of the least mean squares algorithm, the recursive least squares (RLS) algorithms, or the Kalman filtering algorithm.

Computation of the residual echo values in the reinitializing mode was carried out sequentially in the preceding embodiments, but parallel processing hardware can be used to carry out the computations for different candidate values concurrently. For example, all of the residual values for a given segment can be computed in parallel. Computations of residual values for different segments can also be performed in parallel. The speed gained by parallel processing can be used to test more combinations of the candidate values. For example, each candidate value for the second segment can be tested in combination with all candidate values for the first segment, and the best candidate values for these two segments can be selected according to the results obtained from testing all of these combinations.

The echo canceler may be combined with a noise canceler that eliminates local background noise from the signal Sout returned to the far end. The candidate values can then be evaluated on the basis of the output of the noise canceler.

The candidate values stored in the candidate data memory 111 need not be fixed values. After the reinitialization process has been completed and the tap coefficients have converged to stable values in the normal mode, the candidate values that gave the worst results during the reinitialization process can be deleted from the candidate data memory 111, and replaced by representative values determined from the new stable values of the tap coefficients in each segment. Convergence of the tap coefficients to stable values can be determined from echo attenuation, or from elapsed time.

The present invention is not limited to application in acoustic echo cancelers, but can also be applied to electrical echo cancelers, such as echo cancelers that cancel electrical echo signals arising in the hybrid coils that convert between two-wire and four-wire telephone circuits.

The invention can be practiced in both hardware-based echo cancelers and software-based echo cancelers.

Those skilled in the art will recognize that further variations are possible within the scope claimed below.

What is claimed is:

1. A method of reinitializing coefficients of an adaptive filter in an echo canceler, the adaptive filter adjusting said coefficients to match characteristics of an echo path, and applying said coefficients to samples of a received signal to generate an echo replica that is subtracted from a local input signal to create a residual signal for outgoing transmission, comprising the steps of:

grouping said coefficients into a plurality of segments;

storing a plurality of candidate values for each one of said segments;

monitoring signal levels in said echo canceler to determine when reinitialization is necessary;

testing said candidate values, when reinitialization is determined to be necessary, by assigning each one of said candidate values to all of the coefficients in the corresponding one of said segments;

generating echo replicas and corresponding residual signals by using the candidate values thus assigned;

selecting a best candidate value for each one of said segments by evaluating said residual signals; and assigning each selected best candidate value to all of the coefficients in the corresponding one of said segments.

2. The method of claim 1, wherein all of said segments have equal numbers of said coefficients.

3. The method of claim 2, wherein all of said segments have equal numbers of said candidate values.

4. The method of claim 1, said segments being numbered in an order such that the coefficients in lower-numbered segments are applied to more recent samples of said received signal than are the coefficients in higher-numbered segments, wherein at least one of said segments has more said coefficients than does a lower-numbered segment.

5. The method of claim 4, wherein at least one of said segments has fewer candidate values than does a lower-numbered segment.

6. The method of claim 1, said segments being numbered in an order such that the coefficients in lower-numbered segments are applied to more recent samples of said received signal than are the coefficients in higher-numbered segments, wherein said steps of generating and selecting are carried out on said segments one at a time, starting from a lowest-numbered segment and proceeding toward a highest-numbered segment.

7. The method of claim 6 wherein, when said steps of generating and selecting are being carried out on one of said segments, the coefficients in lower-numbered segments are assigned respective already-selected best candidate values, and the coefficients in higher-numbered segments are assigned values of zero.

8. The method of claim 1, wherein said candidate values are fixed.

9. The method of claim 1, further comprising the steps of:
selecting a worst candidate value for each one of said segments by evaluating said residual signals; and
replacing said worst candidate value with a new candidate value.

10. The method of claim 1, further comprising the step of specifying a length for each of said segments and a number of candidate values for each of said segments.

11. An echo canceler having an adaptive filter with coefficients that are applied to samples of a received signal to generate an echo replica which is subtracted from a local input signal to create a residual signal for outgoing transmission, the adaptive filter adjusting the coefficients to match characteristics of an echo path, the coefficients of said adaptive filter being grouped into segments, comprising:

a supervisor for monitoring signal levels in said echo canceler to determine when reinitialization is necessary, and issuing a reinitialization command when reinitialization is necessary;

a candidate data memory storing a plurality of candidate values for each of one of said segments, each of said candidate values being applicable to all coefficients in a corresponding one of said segments;

a reinitializer coupled to said supervisor and said candidate data memory, for assigning said candidate values to the coefficients in corresponding segments, in response to said reinitialization command, causing said adaptive filter to generate corresponding echo replicas, thus producing corresponding residual signals; and an evaluator for selecting a best one of said candidate values for each one of said segments by evaluating said residual signals.

12. The echo canceler of claim 11, wherein all of said segments have equal numbers of said coefficients.

13. The echo canceler of claim 12, wherein all of said segments have equal numbers of said candidate values.

14. The echo canceler of claim 11, said segments being numbered in an order such that the coefficients in lower-numbered segments are applied to more recent samples of said received signal than are the coefficients in higher-numbered segments, wherein at least one of said segments has more coefficients than does a lower-numbered segment.

15. The echo canceler of claim 14, wherein at least one of said segments has fewer candidate values than does a lower-numbered segment.

16. The echo canceler of claim 11, said segments being numbered in an order such that the coefficients in lower-numbered segments are applied to more recent samples of said received signal than are the coefficients in higher-numbered segments, wherein said reinitializer operates on one of said segments at a time, starting from a lowest-numbered segment and proceeding toward a highest-numbered segment.

17. The echo canceler of claim 16 wherein, when said reinitializer is operating on one of said segments, the coefficients in lower-numbered segments are assigned respective best candidate values as selected previously by said evaluator, and the coefficients in higher-numbered segments are assigned values of zero.

18. The echo canceler of claim 11, wherein the candidate values in said candidate data memory are fixed.

19. The echo canceler of claim 11, wherein said evaluator further selects a worst candidate value for each one of said segments, by evaluating said residual signals, and replaces said worst candidate value with a new candidate value.

20. The echo canceler of claim 11, further comprising a segmentation data memory coupled to said supervisor for specifying a length for each of said segments and a number of candidate values for each of said segments.

* * * * *